(12) United States Patent
Quesnel

(10) Patent No.: US 8,500,073 B2
(45) Date of Patent: Aug. 6, 2013

(54) HINGED BUSHING SUSPENSION CLAMP AND METHOD FOR USING SAID CLAMP

(75) Inventor: Wayne L. Quesnel, Spartanburg, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 160 days.

(21) Appl. No.: 12/280,583

(22) PCT Filed: Dec. 18, 2007

(86) PCT No.: PCT/US2007/087969
§ 371 (c)(1),
(2), (4) Date: Aug. 25, 2008

(87) PCT Pub. No.: WO2008/077055
PCT Pub. Date: Jun. 26, 2008

(65) Prior Publication Data
US 2009/0014208 A1    Jan. 15, 2009

Related U.S. Application Data

(60) Provisional application No. 60/870,466, filed on Dec. 18, 2006.

(51) Int. Cl.
*F16L 3/08* (2006.01)
(52) U.S. Cl.
USPC .................. 248/74.4; 248/74.1; 248/231.51; 248/230.4; 248/316.5; 24/285; 24/514; 81/318; 324/127; 324/117 R

(58) Field of Classification Search
USPC ............ 248/68.1, 74.1, 74.4, 229.14, 229.24, 248/228.5, 229.13, 229.23, 228.4, 230.4, 248/230.5, 231.51, 231.61, 316.6, 316.5, 248/62; 324/127, 117 R, 117 H, 158.1; 81/318, 81/324, 326, 325, 333, 335, 334; 24/285, 24/514, 521, 329
See application file for complete search history.

(56) References Cited

U.S. PATENT DOCUMENTS

| | | | | |
|---|---|---|---|---|
| 393,494 A | * | 11/1888 | Whipple | 140/123 |
| 575,779 A | * | 1/1897 | Homan | 248/230.4 |
| 576,769 A | * | 2/1897 | Williams | 24/514 |
| 678,424 A | * | 7/1901 | Rodenberger | 81/487 |
| 753,224 A | * | 3/1904 | Bernard | 81/334 |
| 862,588 A | * | 8/1907 | Rowley | 433/158 |
| 878,049 A | * | 2/1908 | Dikeman | 81/118 |
| 908,256 A | * | 12/1908 | Harrison | 24/514 |
| 995,411 A | * | 6/1911 | Morrill | 248/231.51 |

(Continued)

FOREIGN PATENT DOCUMENTS

| KR | 1020030087867 | 11/2003 |
|---|---|---|
| KR | 200433260 | 12/2006 |

OTHER PUBLICATIONS

International Search Report dated Dec. 18, 2007 and Written Opinion.

*Primary Examiner* — Kimberly Wood
(74) *Attorney, Agent, or Firm* — Sughrue Mion, PLLC

(57) ABSTRACT

A clamp with a first clamp halve with a hinge portion and a first opening for a fastener; a second clamp halve, with a hinge portion and a first opening for a fastener; a cable opening; and a hinge device for connecting the two hinge portions. The clamp may also include a first clamp halve with a second opening for a closing insert.

15 Claims, 19 Drawing Sheets

U.S. PATENT DOCUMENTS

| | | | |
|---|---|---|---|
| 1,070,656 A * | 8/1913 | Anderson | 81/118 |
| 1,094,400 A * | 4/1914 | Burgess | 269/165 |
| 1,304,503 A * | 5/1919 | Miller | 313/146 |
| 1,453,863 A * | 5/1923 | Conard | 81/335 |
| 1,534,642 A * | 4/1925 | Hoagland | 248/514 |
| 1,540,745 A * | 6/1925 | Bain | 81/335 |
| 1,640,883 A * | 8/1927 | Coleman | 81/424.5 |
| 1,688,765 A * | 10/1928 | Veras | 248/103 |
| 1,766,546 A * | 6/1930 | Roos | 33/558.1 |
| 2,291,413 A * | 7/1942 | Siebrandt | 606/103 |
| 2,397,438 A * | 3/1946 | Schmid | 285/261 |
| 3,178,139 A * | 4/1965 | McFarlin | 248/539 |
| 3,337,880 A * | 8/1967 | Florek | 5/503.1 |
| 4,485,530 A * | 12/1984 | Begley et al. | 24/270 |
| 4,657,284 A * | 4/1987 | Fiori | 285/39 |
| 4,892,276 A * | 1/1990 | Alessio | 248/74.1 |
| 5,692,544 A * | 12/1997 | Friedrich et al. | 138/99 |
| 5,936,197 A | 8/1999 | Katoh et al. | |
| 6,135,398 A * | 10/2000 | Quesnel | 248/74.1 |
| 6,440,145 B1 * | 8/2002 | Assawah | 606/151 |
| 6,595,472 B1 * | 7/2003 | Pisczak | 248/74.1 |
| 6,774,303 B1 * | 8/2004 | Brittain et al. | 174/42 |
| 2004/0149474 A1 * | 8/2004 | Brittain et al. | 174/42 |

\* cited by examiner

HINGED BUSHING SUSPENSION CLAMP AND METHOD FOR USING SAID CLAMP

This is a National Stage Entry of PCT/US2007/087969, filed May 20, 2008, which claims benefit of U.S. Provisional Application No. 60/870,466, filed on Dec. 18, 2006, which is incorporated herein by reference.

BACKGROUND OF THE INVENTION

1. Field of the Invention

The present invention relates to a clamp for suspending a cable and a method for attaching the clamp to a cable. More particularly, it related to a hinged bushing suspension clamp for suspended a cable and a method for attaching the hinged clamp to a suspended cable.

2. Description of the Related Art

Power cables are frequently suspended aerially from poles or other support structures. An aerial arrangement of such cables has the advantages of relatively simple and flexible installation having a limited ground footprint, and permits space substantially below the cables to be used for other purposes. An aerial arrangement also separates the cables from contact with people or roaming ground animals. Spatial separation is particularly important for high tension electrical power transmission cables for safety reasons. Separation of any cable helps protect the cable from damage caused either inadvertently or through malicious vandalism.

Although aerial cables are relatively safe from ground-based sources of damage, they are subject to environmental wear and damage, principally due to winds. Well known in the art are problems caused by aeolian vibration which is a high frequency, low amplitude vibration caused by laminar winds passing across the line, as well as galloping which is a low frequency, high amplitude wind-induced cable motion. Aeolian vibration, galloping, and other wind action can produce cable damage especially at the suspension points where cable clamps and other supporting devices mechanically stress the cable. Cable damage in the form of abrasion, wear, and fatigue can occur especially at the clamping points. The fatigue of the conductor at the clamping point is directly related to the amount of bending at this location. The amount of bending a conductor can endure without failure is known as its "Maximum Safe Bending Amplitude." This value is normally given in "mils" and varies by the amount of tension in the transmission line.

One prior art cable clamp found in U.S. Pat. No. 6,595,472. That cable clamp is opened and hinges by means of two bolts at the bottom of the clamp. The conductor is installed down between the "mounting ears" and sits into a metal groove with bushings at its exit. Three bolts are then tightened around the conductor. However, if the three bolts are not tightened in a method to keep the clamps halves parallel, the ears will end up with an angle between. This will not allow the attachment pin to install through the holes in both ears. Also, a tightening sequence must be followed between the upper bolt and lower bolts to ensure even load on the conductor. While this prior art clamp is difficult to install on un-energized transmission lines, it is even more difficult to install on energized transmission lines because "hot-line" tools must be used.

Another disadvantage of this design is that if installer does not sequentially torque the bolts to an equal amount, a bending moment occurs on the bolt/bolts with less torque. If the two bottom bolts are torque excessively, this makes the top (single) bolts experience a bending moment making it difficult to turn and tighten. This hinge design involves repeated tightening of bolts, in small torque increments, until desired installation torque is achieved.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

One clamp according to an embodiment of the present invention includes a first clamp halve with a hinge portion and a first opening for a fastener; a second clamp halve, with a hinge portion and a first opening for a fastener, a cable opening; and a hinge device for connecting the two hinge portions.

The clamp can also include a fastener, wherein the fastener is inserted in the fastening openings and the fastener tightens the clamp.

The clamp can also include bushings.

In the clamp of claim 1, the hinge portions are above the cable opening and the fastener is below the cable opening.

Another embodiment of the clamp includes a first clamp halve with a hinge portion, a first opening for a fastener; and a second opening for a closing insert. The clamp also includes a second clamp halve, with a hinge portion and a first opening for a fastener. The clamp also includes a cable opening and a hinge device for connecting the two hinge portions.

The clamp may also include a closing insert that is inserted in the closing insert opening, wherein said closing insert causes the clamp to close.

An embodiment of the method of the invention includes opening the clamp, placing the clamp over a cable, closing the clamp and tightening the clamp with a fastener.

In another embodiment of the method of the invention clamp is closed by inserting a closing insert.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

Figure 1:
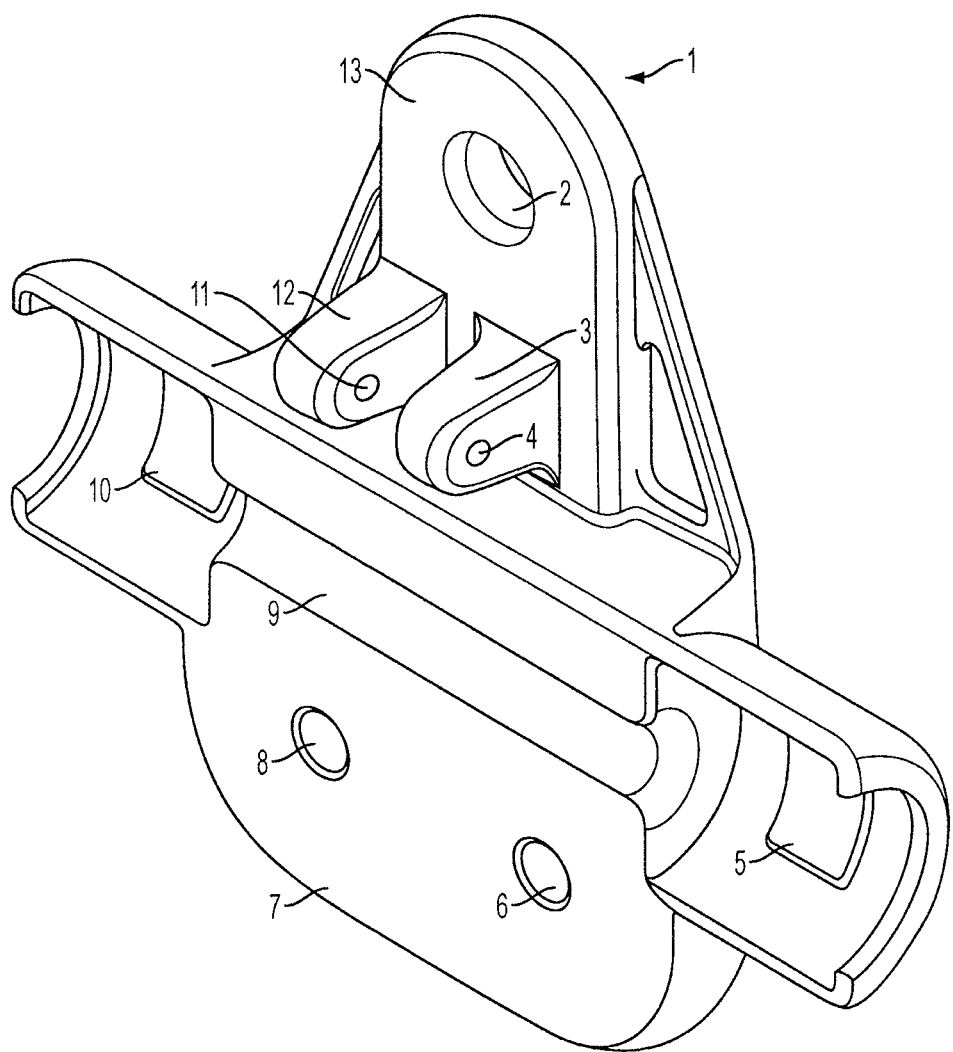
FIGS. 1 and 1A are perspective views of a right clamp halve of an embodiment of the inventive clamp.

DETAILED DESCRIPTION OF THE ILLUSTRATIVE NON-LIMITING EMBODIMENTS OF THE INVENTION

Hereinafter, the present invention will be described in detail by way of exemplary embodiments with reference to the drawings. The described exemplary embodiments are intended to assist in the understanding of the invention, and are not intended to limit the scope of the invention in any way. Throughout the drawings for explaining the exemplary embodiments, those components having identical functions carry the same reference numerals for which duplicate explanations will be omitted.

An embodiment of the inventive clamp will now be described with reference to FIGS. 1-8, 10 and 11. The clamp includes two clamp halves 1 and 21. Each clamp halve includes two fastener openings 6, 8 and 26, 28. The fastener openings in one of the clamp halves is threaded (see FIG. 5), while the fastener openings in the other clamp have are not threaded (see FIG. 1). Although each clamp halve 1 and 21 are shown with two fastener openings, each have may also have one opening or more than two openings. Each clamp halve also includes a hinge portion 3, 12 and 23, 32. In the embodiment in the figures, each clamp halve has two hinge portions; however, each clamp may also have one hinge portion or more than two hinge portions. The hinge portions have an opening 4, 11, 24, 31 for a hinge device 58 which is used to connect the two clamp halves at the hinge portions. Hinge device 58 may be a pin or other suitable connecting device. Each clamp halve also includes a cable opening 9, 29. When the clamp is closed, the cable openings 9, 29 will clamp onto a cable 40. Each clamp half may also include suspension openings 2 and 22.

Figure 9:
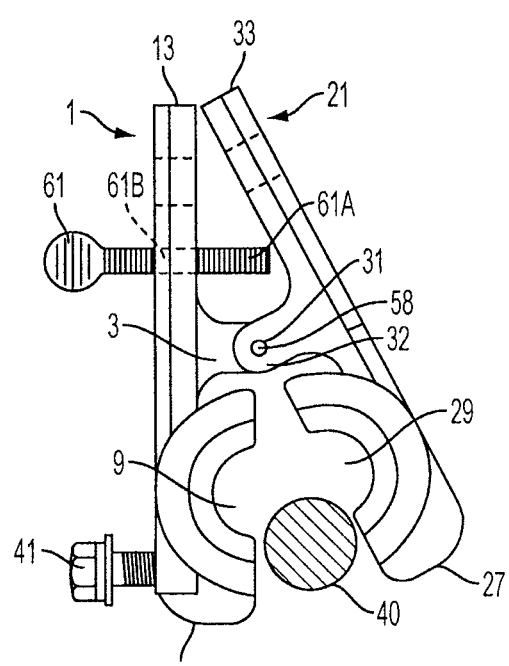
FIG. 9 is a side view of an embodiment of the inventive clamp in an open position.
Figure 10:
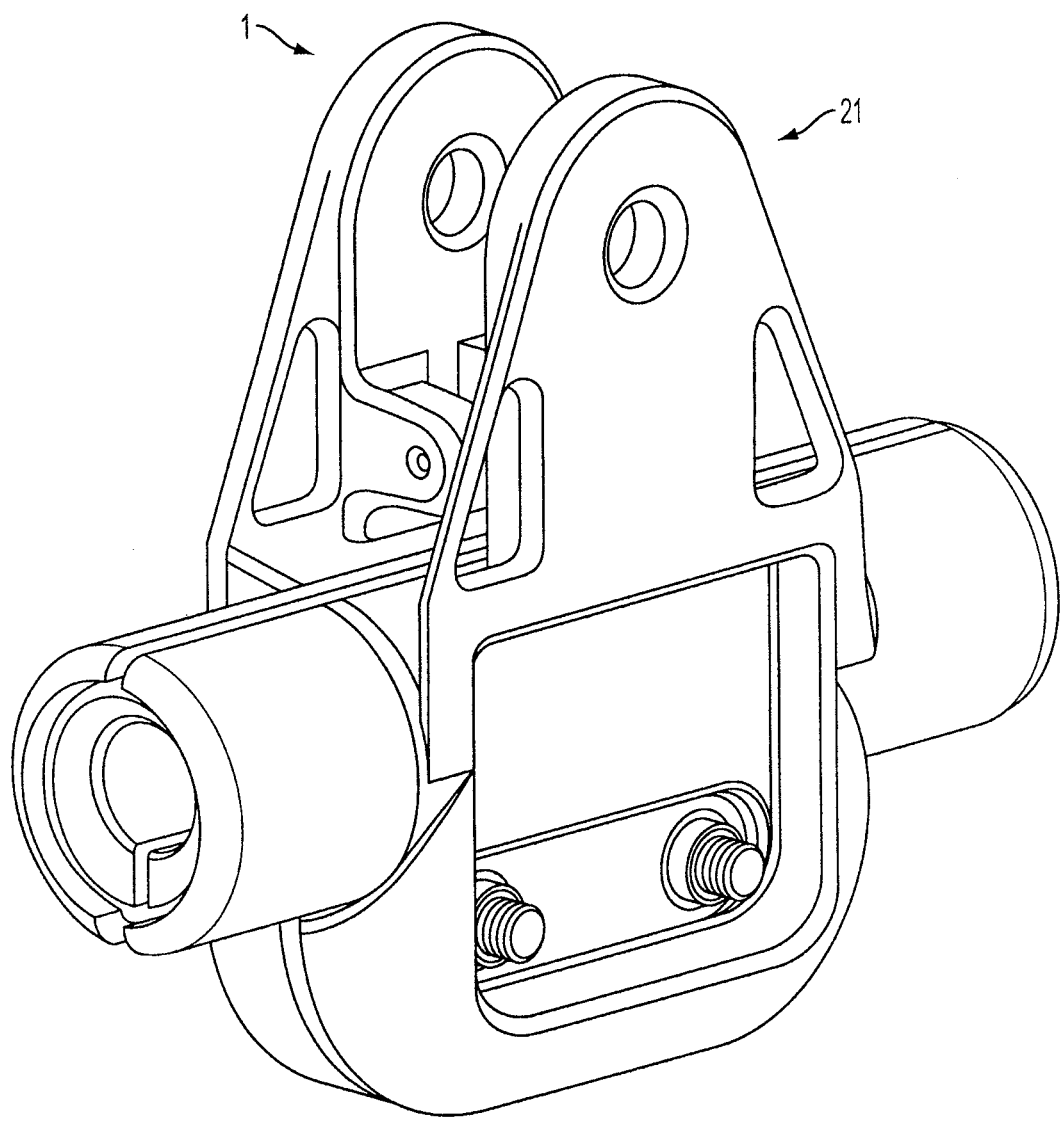
FIGS. 10 and 11 are perspective views of an embodiment of the inventive clamp.
Figure 11:
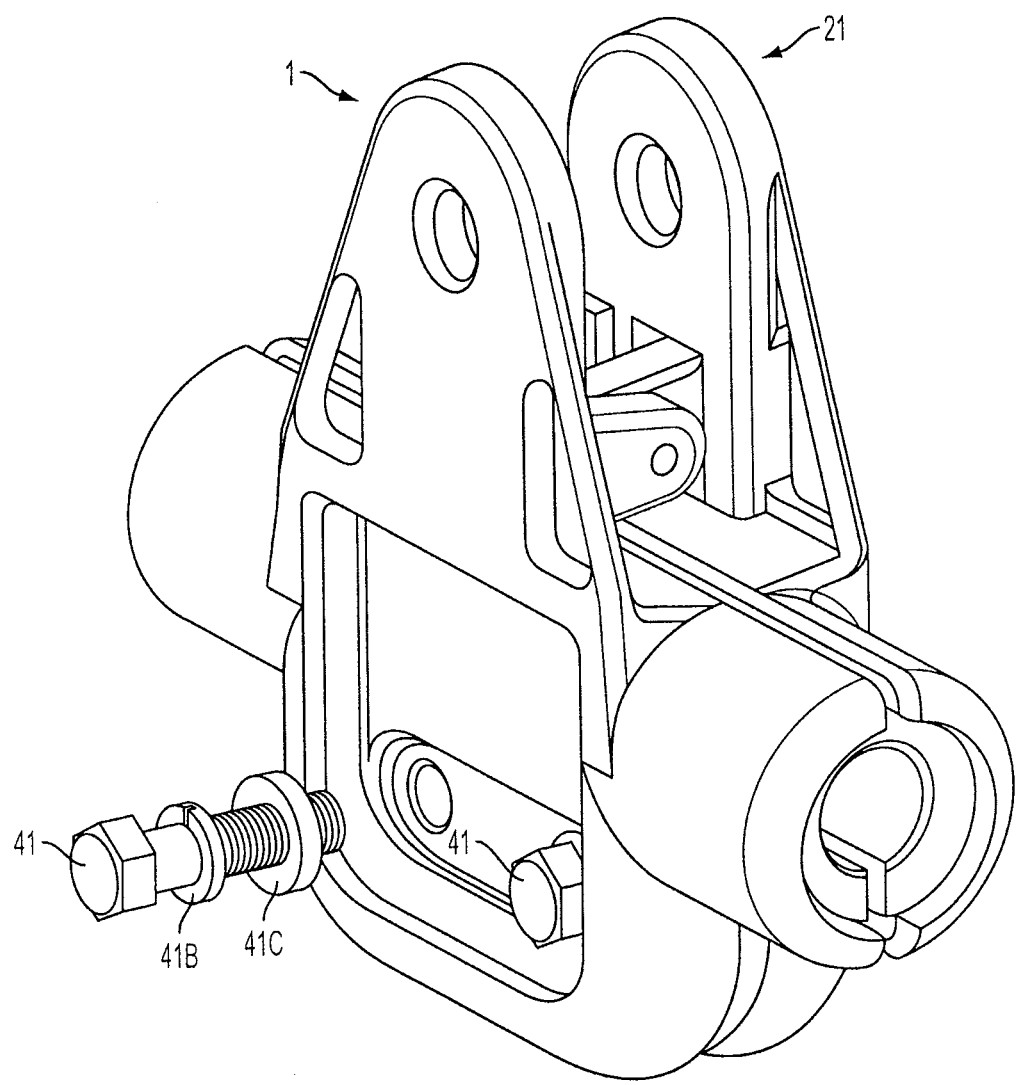
Figure 12:
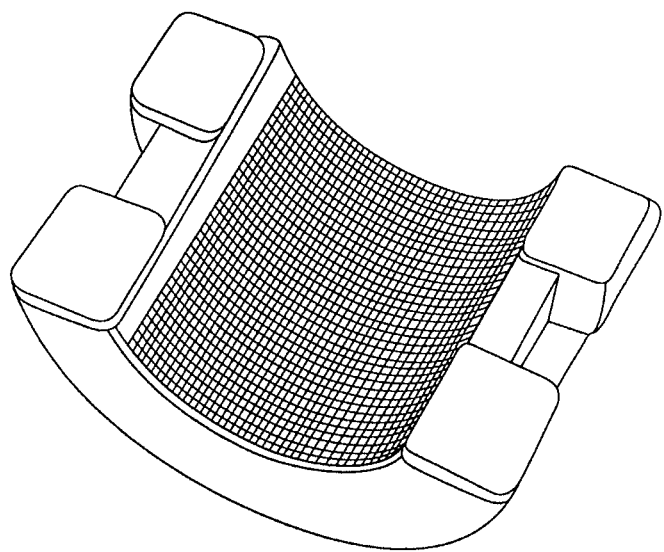
FIGS. 12 and 13 show an example of a bushing for use in an embodiment of the inventive clamp.
Figure 13:
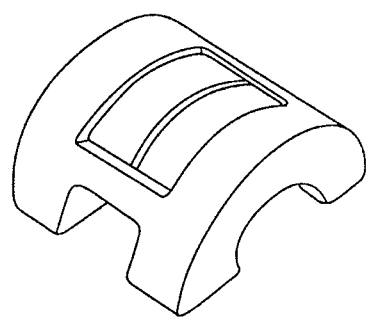
Figure 15:
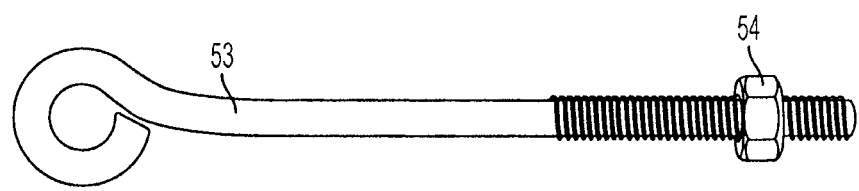
FIGS. 15 and 16 show an eyehook that can be used in connection with an embodiment of the inventive clamp.
Figure 16:
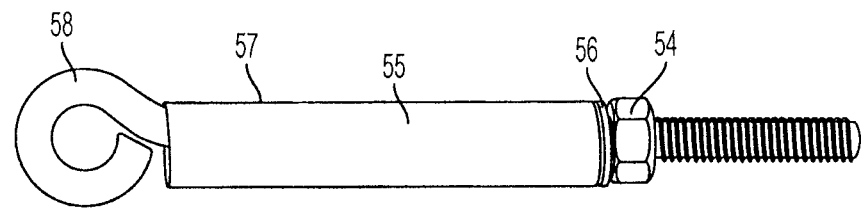

In another embodiment, as shown in FIG. 9, at least one of the clamp halves has an opening 61B for a closing insert 61. The opening for the closing insert is typically threaded. One example of a closing insert is a thumbscrew 61. Other examples of the closing insert include an eyehook 53, an example of which is shown in FIG. 15, and a modified eyehook 57, an example of which is shown in FIG. 16. When the closing insert is not fully screwed into the closing insert opening, the clamp can be squeezed at the top 13, 33 like a hinged clothespin to fully open the bottom 7, 27 of the clamp. While the clamp is in the open position, as shown for example in FIG. 9, the clamp can be placed around a cable 40.

After the clamp has been placed around the cable 40, the closing insert 61 can be screwed in, causing the tip portion 61A to be forced against the inside of the other clamp halve until the clamp halves fully close around the cable 40. After the clamp halves are closed, fasteners 41 are inserted into the fastener openings 6, 8 and 26, 28. In the example shown in FIG. 11, lock washers 41B and washers 41C are placed on the fastener prior to being inserted in the fastener openings. The fasteners as then tightened to secure the clamp to the cable. The fasteners can be bolts or other fastening devices After the clamp has been tightened, the closing insert can be removed.

Figure 1A:
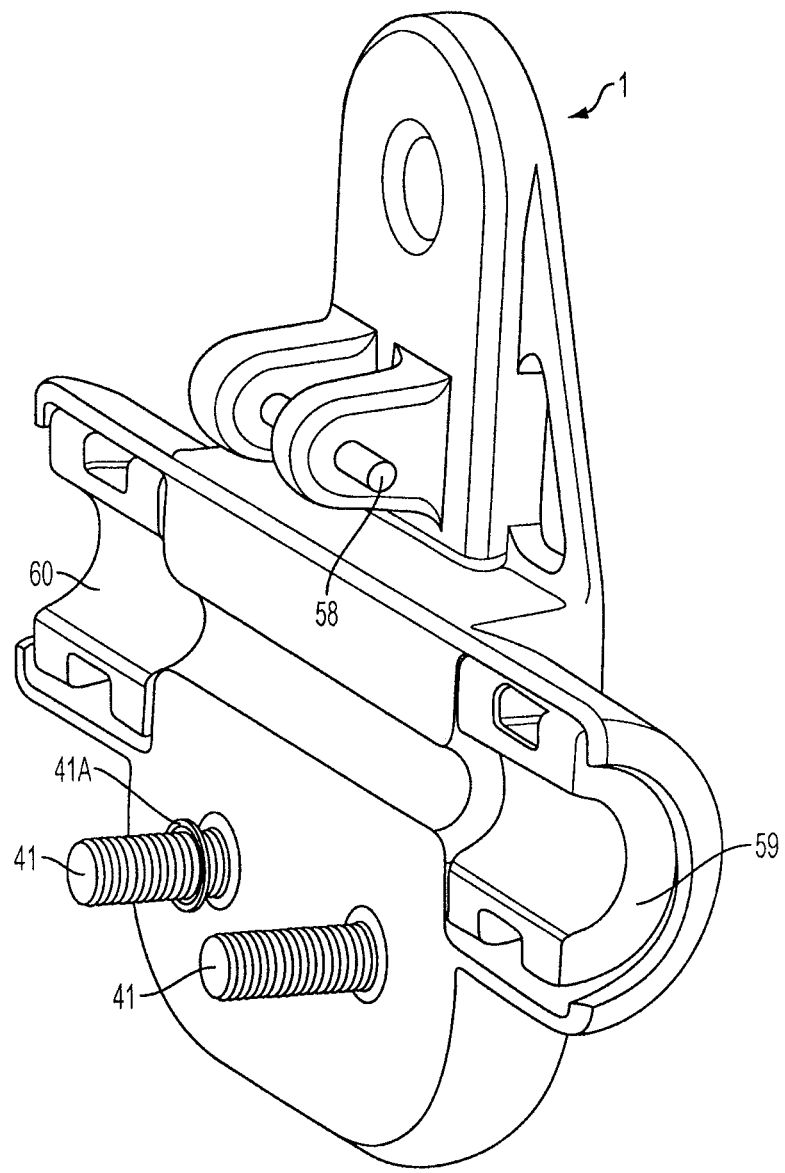
Figure 2:
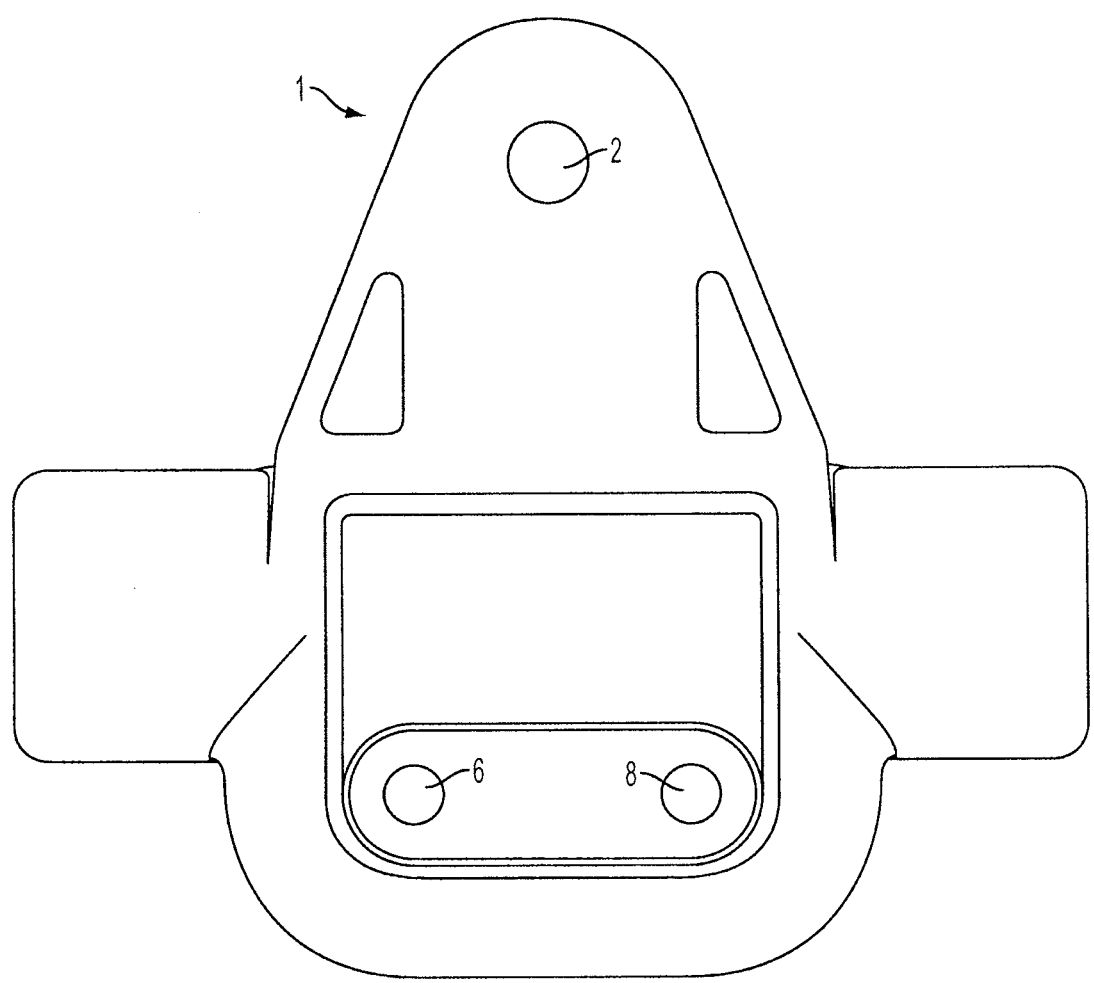
FIG. 2 is a top view of a right clamp halve of an embodiment of the inventive clamp.
Figure 3:
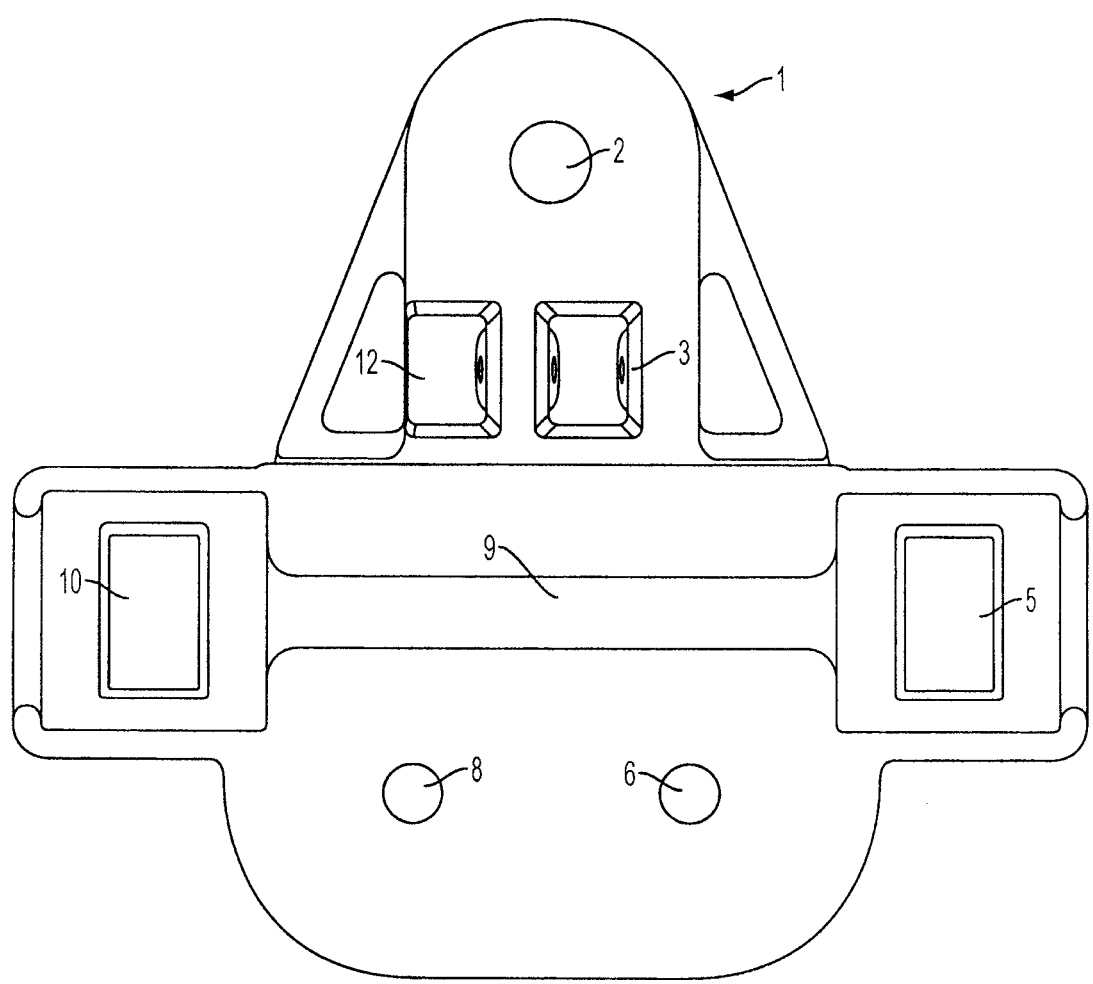
FIG. 3 is a bottom view of a right clamp halve of an embodiment of the inventive clamp.
Figure 4:
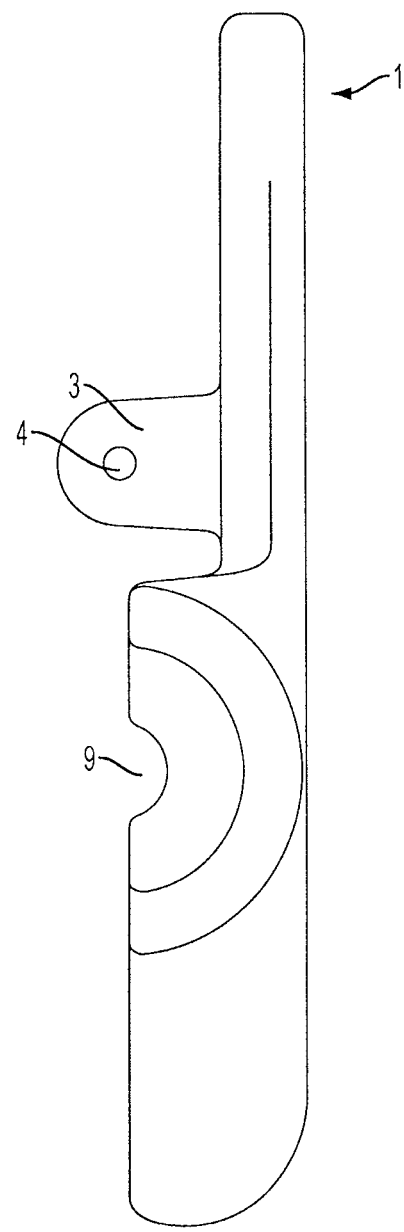
FIG. 4 is a side view of a right clamp halve of an embodiment of the inventive clamp.
Figure 5:
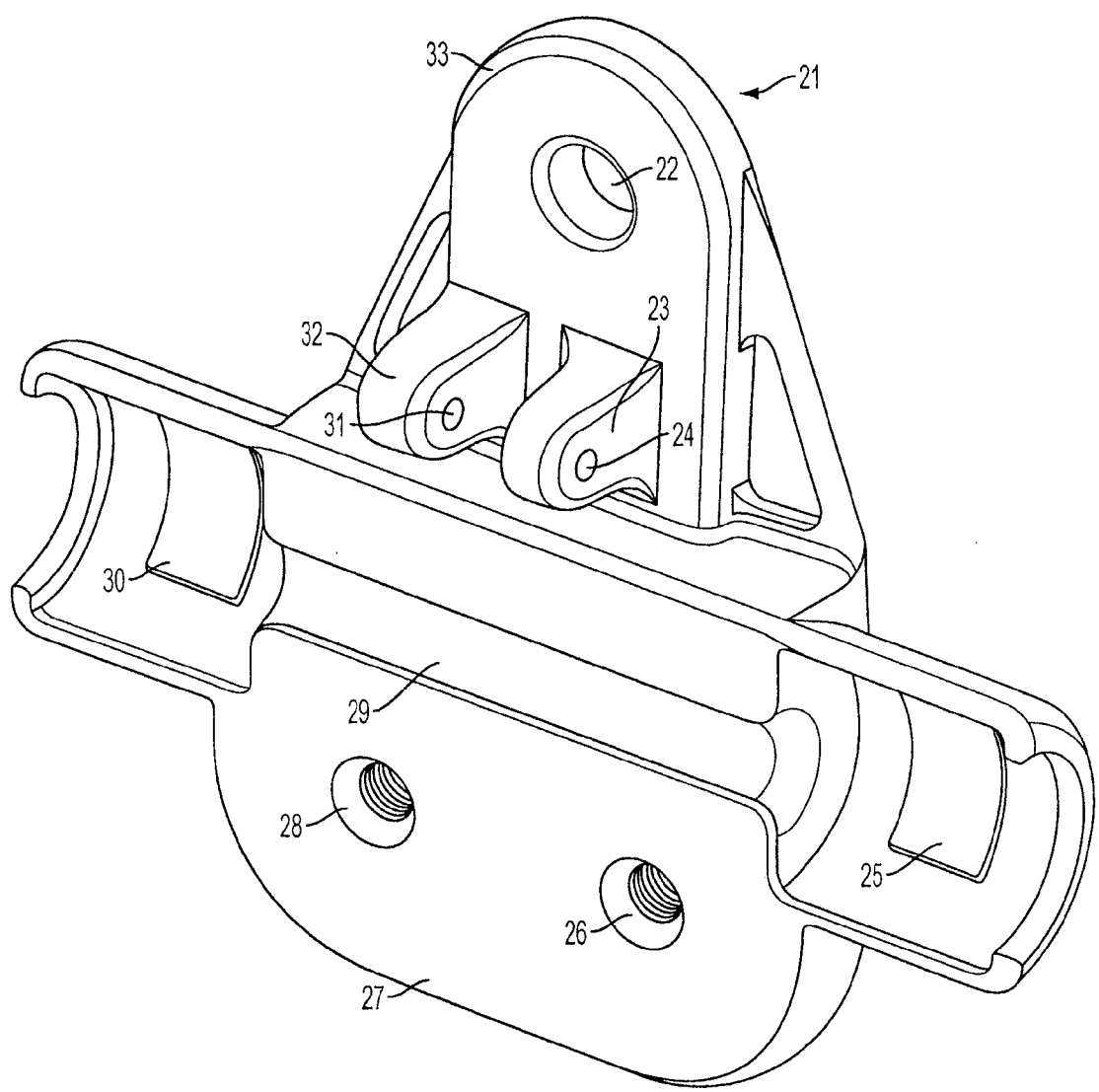
FIG. 5 is a perspective view of a left clamp halve of an embodiment of the inventive clamp.
Figure 6A:
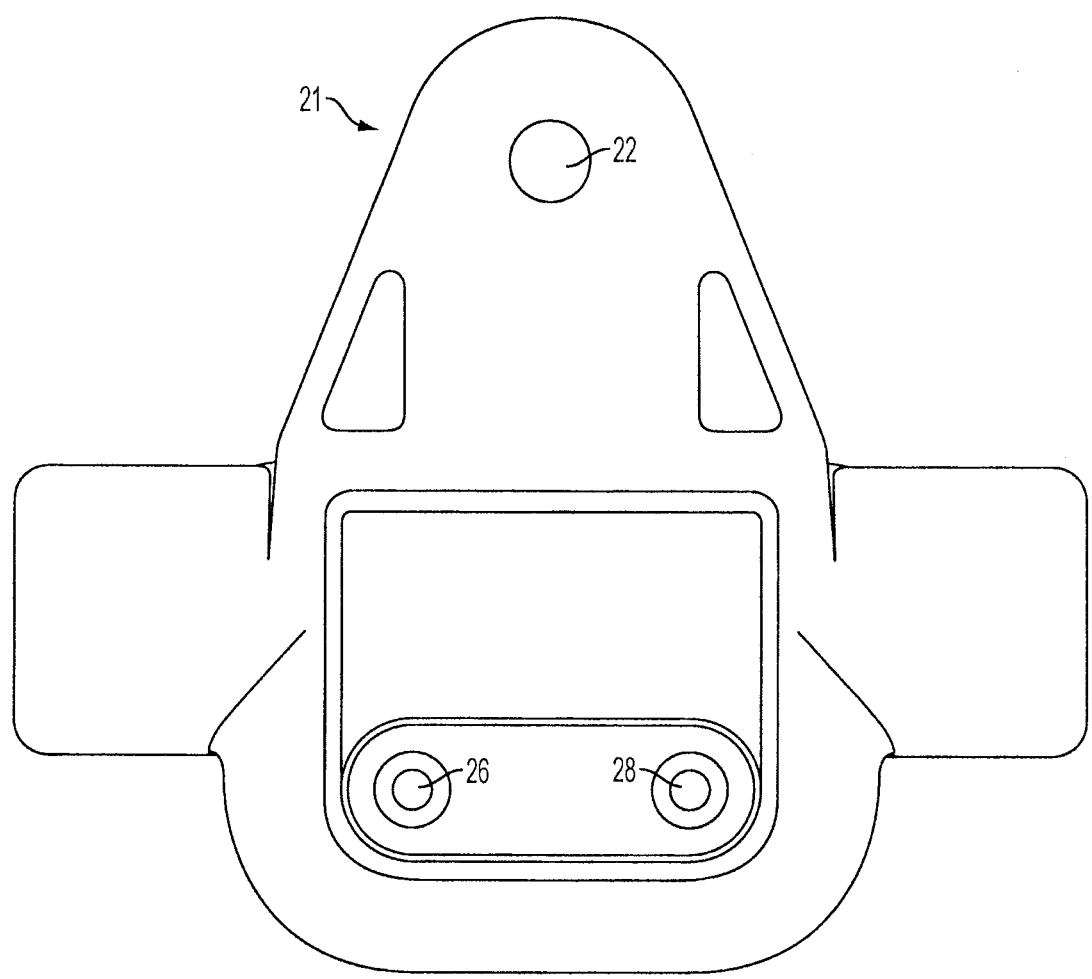
FIGS. 6A and 6B are a top view and perspective view of a left clamp halve of an embodiment of the inventive clamp.
Figure 6B:
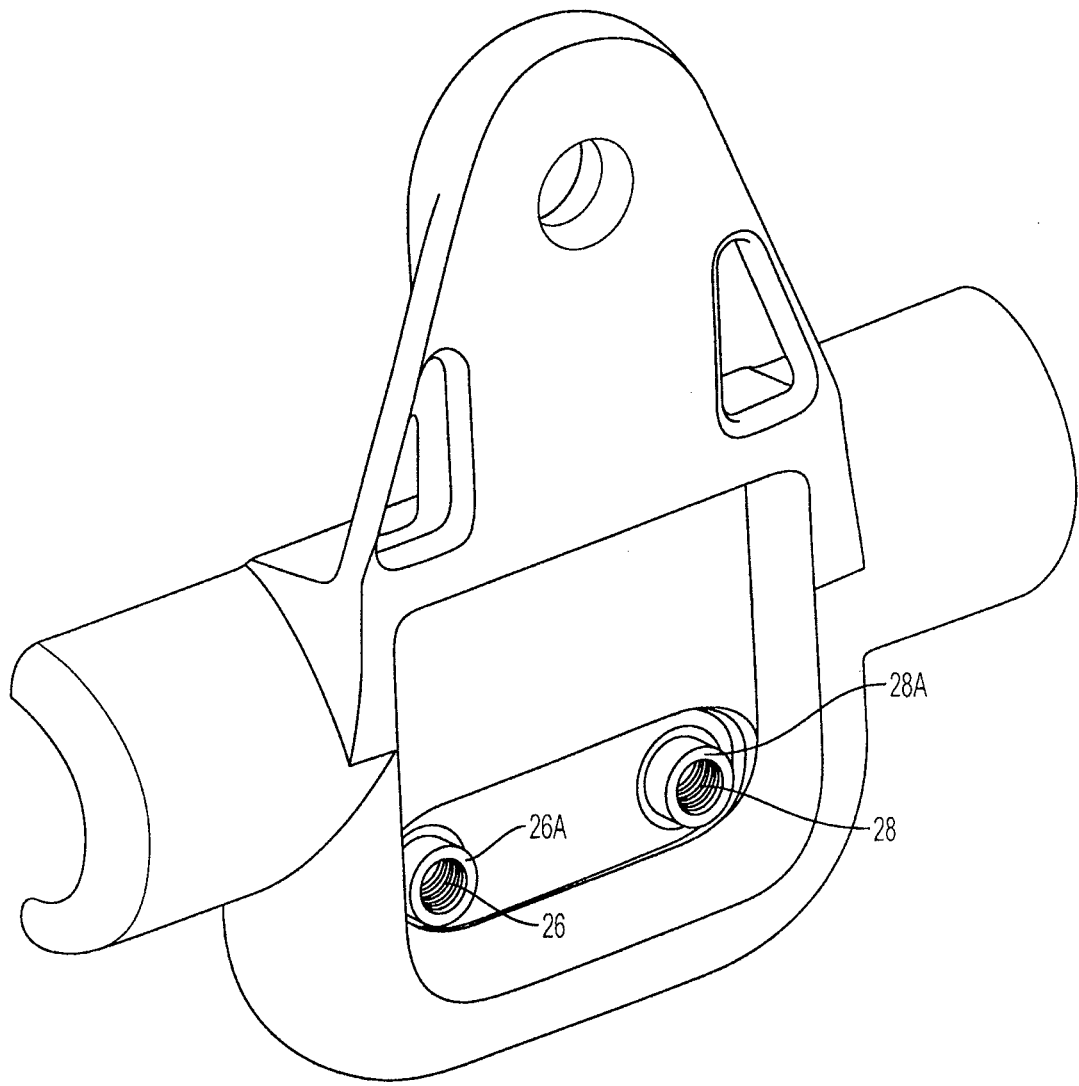
Figure 7:
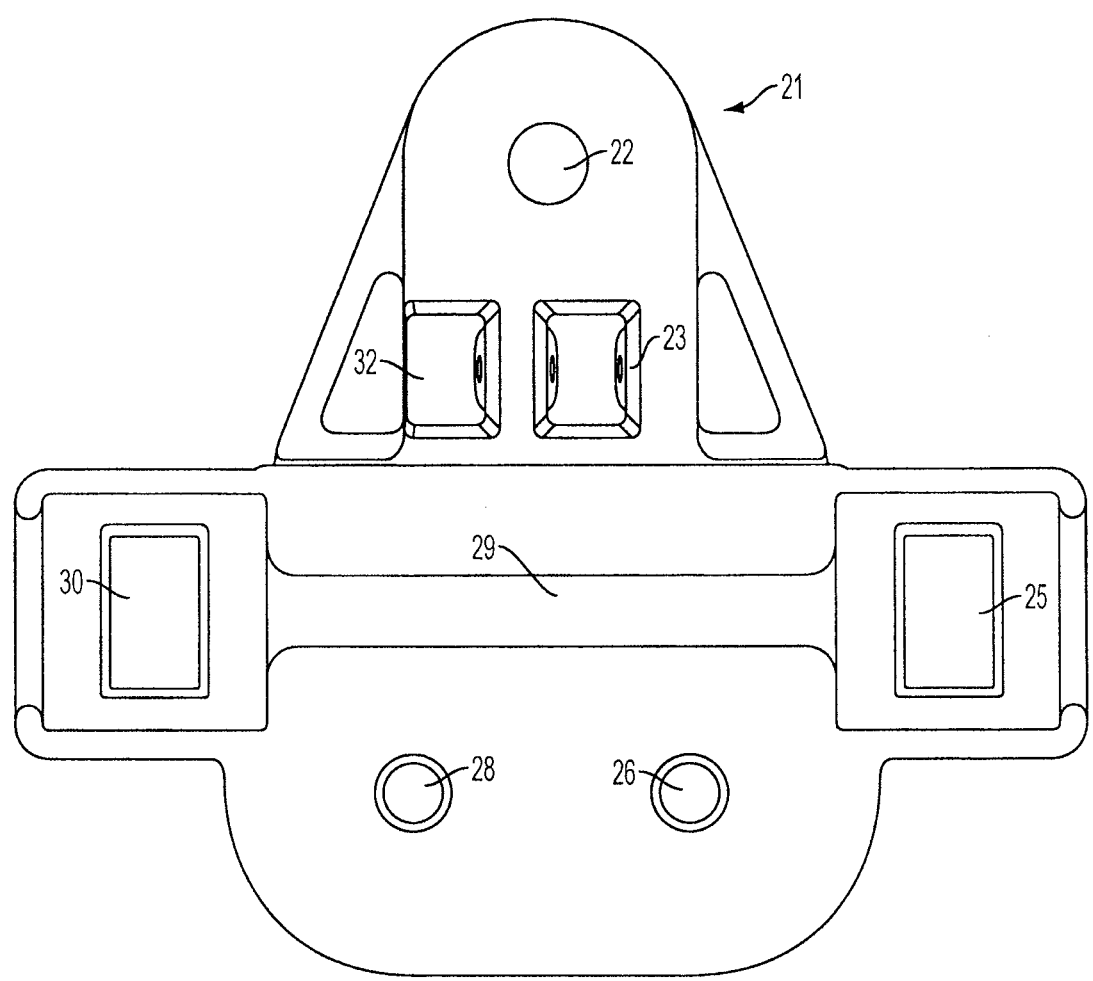
FIG. 7 is a bottom view of a left clamp halve of an embodiment of the inventive clamp.
Figure 8:
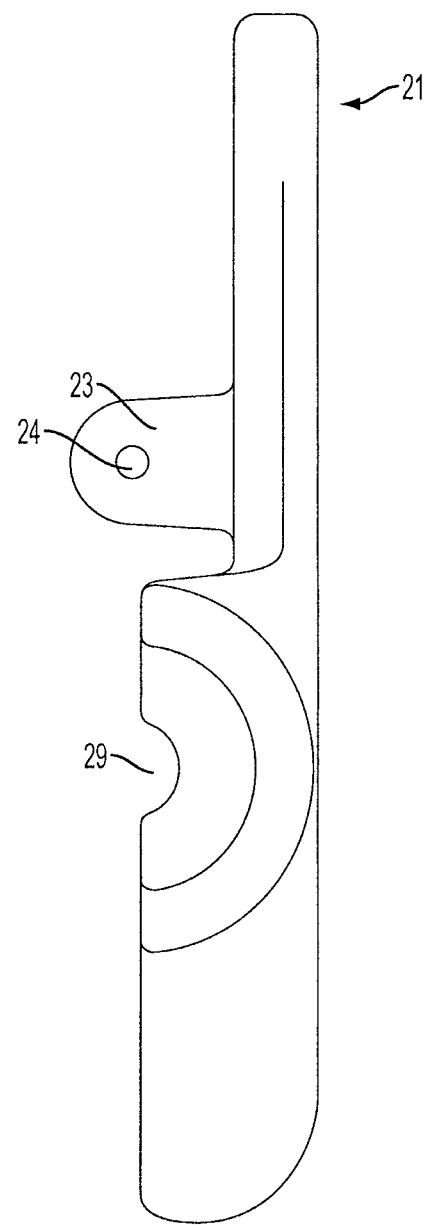
FIG. 8 is a side view of a left clamp halve of an embodiment of the inventive clamp.

In another embodiment, the fasteners 41 can be held in place in one of the clamp halves by captive hardware, such as a o-ring 41A or rubber washer. See for example, FIG. 1A. The captive hardware would not get in the way of the closing of the clamp halves because it would fit in chamfered portion of the fastener openings.

In another embodiment, the fastener openings that are threaded may extend out from the clamp halve by a certain amount, such as ⅝ in., to increase tightening strength. See for example 26A and 28A, in FIG. 6B.

The clamp can also be attached to a cable without the use of a closing insert 61. For example, the top portions 13, 33 can be squeezed like a clothespin to open the clamp. After the clamp is placed around the cable, the bottom portions 7, 27 can be squeezed together around the cable 40. Then the fasteners are tightened.

The cable halves 1 and 21 may also include spaces 5, 10 and 25, 30 that hold bushings 59, 60 (the bushings for clamp halve 21 are not shown). The bushings are typically made of an elastomer material. The bushings help reduce the bending amplitude of the conductor.

Figure 14:
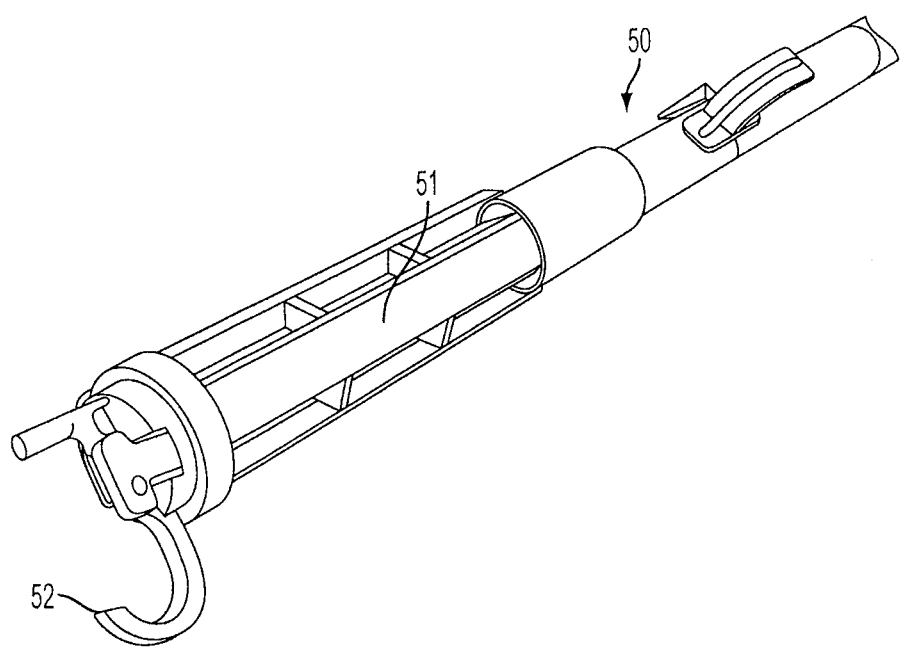
FIG. 14 shows a hot stick used to install an embodiment of the inventive clamp on a cable.

Next an embodiment of a method of installing a clamp on a cable with an attaching device will be described. Attaching devices are typically used when clamps are installed on energized cables and the installer does not want to come in contact with the cable. FIG. 14 shows an example of an attaching device 50. These attaching devices are sometimes called "hot sticks." The attaching device includes a hook portion 52 and a sleeve portion 51. The hook portion 52 can be pulled into the sleeve portion 51, thereby closing the hook portion.

As mentioned above, the closing insert can be an eyehook 53 as shown in FIG. 15, or a modified eyehook 57, shown in FIG. 16. Modified eyehook 57 is a basic eyehook 53 with a sleeve 55, washer 56 and nut 54. The addition of the sleeve 55 increases the diameter of the eyehook. The increased diameter makes it easier to use the attaching device as discussed below.

Figure 17:
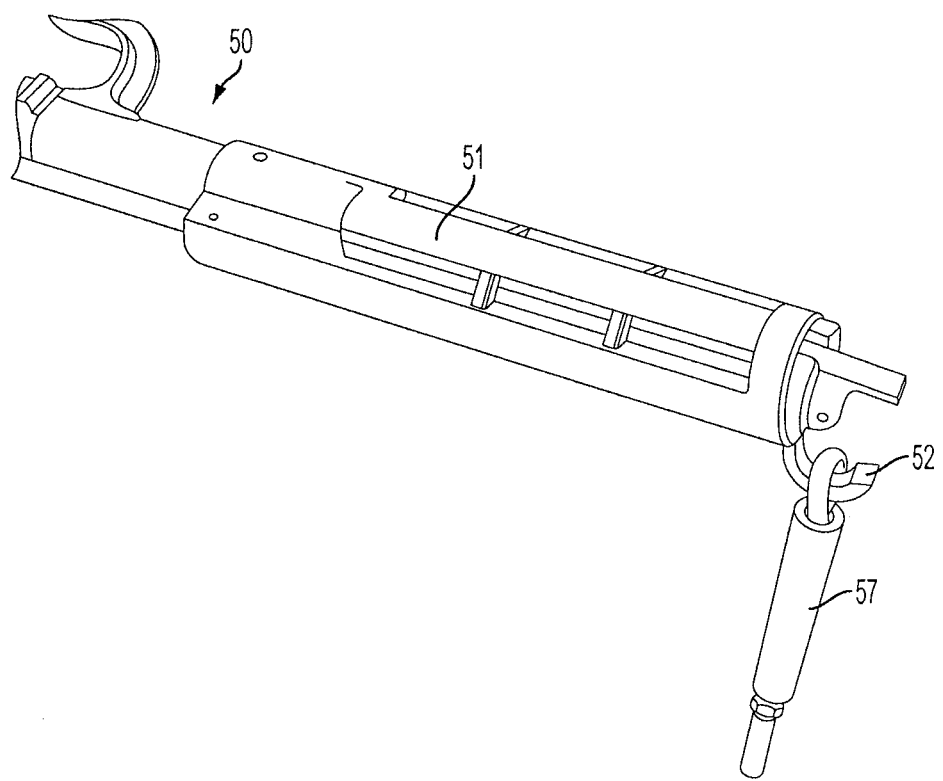
FIGS. 17 and 18 show how a hot stick is used with an eyehook that can be used in holding and installing the inventive clamp.
Figure 18:
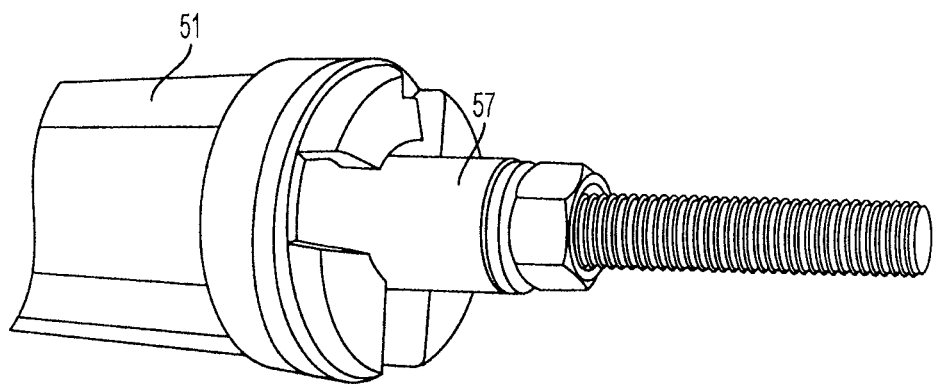

FIG. 17 shows the eye 58 portion of modified eyehook 57 placed on hook portion 52 of the attaching device. Next, the hook portion 52 is pulled inside the sleeve portion 51 to close the hook portion 52 and enclose the modified eyehook 57 as shown in FIG. 18. In this position, because the modified eyehook 57 has the sleeve 55, it is held tight in the attaching device. The attaching device could also be used in a similar manner with a basic eyehook 53, but the eyehook 53 would not be held tight in the attaching device.

Figure 19A:
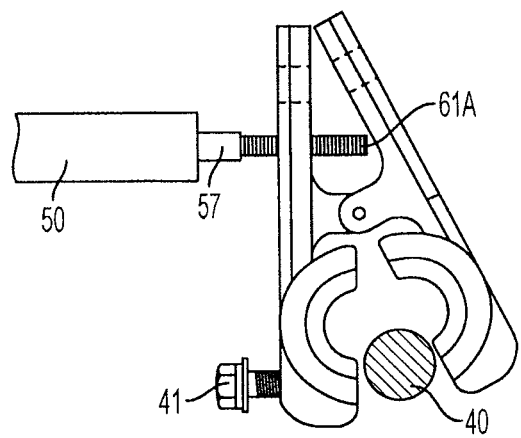
FIGS. 19A-19D show an embodiment of a method to attach an embodiment of the inventive clamp to a cable.
Figure 19B:
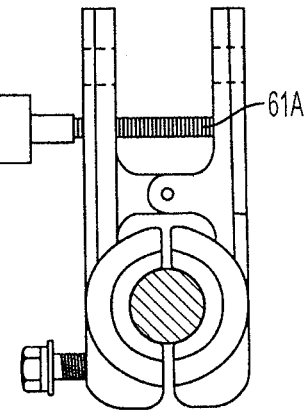
Figure 19C:
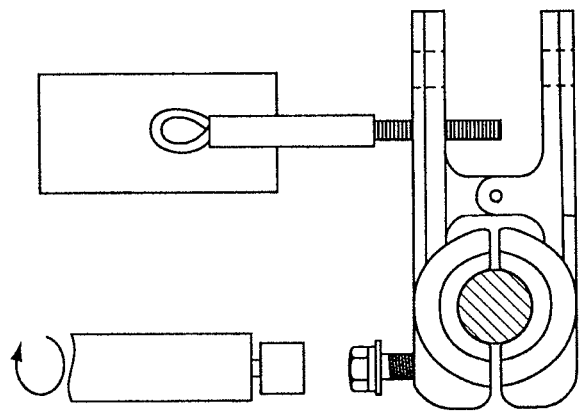

After the closing insert is attached to the attaching device 50, closing insert is screwed into one of the closing insert opening as shown in FIG. 19A. The closing insert is not fully screwed in so that the clamp will still open enough to fit over a cable. The attaching device 50, with the clamp attached, is placed over a cable. Next, the attaching device is turned, thereby screwing in the closing insert, as shown in FIG. 19B. As the closing insert is screwed in, the tip of the insert, such as 61A, pushes against the other clamp halve, thereby closing the clamp over the cable. After the clamp is fully closed over the cable, the attaching device is removed from the inserting device. A different attachment is placed on the end of the attaching device, such as a socket. Then the attaching device is used to tighten the fasteners, as shown in FIG. 19C. Then, the attaching device is used to unscrew and remove the closing insert. Removal of the insert is necessary to prevent corona discharge. See FIG. 19D.

Figure 19D:
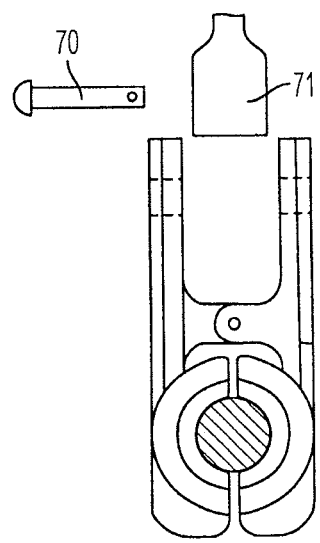

Also, as shown in FIG. 19D, the suspension openings 2, 22 can be used to connect the clamp to an insulator 71 by inserting a pin 70 through the suspension openings and an opening in the insulator.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A clamp for a cable comprising:
a first clamp halve having a clamp portion, a hinge portion, a substantially circular fastener hole disposed on a bottom portion, and a suspension hole disposed on a top portion, the suspension hole and the fastener opening being disposed on opposite sides of the hinge portion;
a second clamp halve having a clamp portion, a hinge portion, a substantially circular fastener hole disposed on a bottom portion, and a suspension hole disposed on a top portion, the suspension hole and the fastener opening being disposed on opposite sides of the hinge portion;
bushings; and
a hinge device for connecting the two hinge portions of the first and the second clamp halves,
wherein the hinge device is inserted through openings of the hinge portions of the first and second clamp halves in a hinge axis direction substantially parallel with length of the cable,
wherein the clamp portion and the hinge portion are disposed between the top portion and the bottom portion,
wherein a same axis extends through a center of the suspension hole of both the first and second clamp halves,
wherein the first and second clamp halves comprise at least two substantially circular fastener holes, and
wherein the bushings are disposed on each side of the clamp portion along the hinge axis direction.

2. The clamp of claim 1, further comprising a fastener, wherein said fastener is inserted in one of said fastening holes and said fastener tightens said clamp.

3. The clamp of claim 1, wherein the hinge portions are above said clamp portions and said substantially circular fastener hole is below said clamps portion.

4. A clamp for a cable comprising:
a first clamp halve having a clamp portion, a hinge portion, a substantially circular fastener hole disposed on a bottom portion, and a suspension hole disposed on a top portion, the suspension hole and the fastener opening being disposed on opposite sides of the hinge portion;
a second clamp halve having a clamp portion, a hinge portion, a substantially circular fastener hole disposed on a bottom portion, and a suspension hole disposed on a top portion, the suspension hole and the fastener opening being disposed on opposite sides of the hinge portion; and
a hinge device for connecting the two hinge portions of the first and the second clamp halves,
wherein the hinge device is inserted through openings of the hinge portions of the first and second clamp halves in a hinge axis direction substantially parallel with length of the cable,
wherein the clamp portion and the hinge portion are disposed between the top portion and the bottom portion, and
wherein a same axis extends through a center of the suspension hole of both the first and second clamp halves,
wherein of the first and second clamp halves, only the first clamp halve comprises a closing insert opening disposed between the suspension hole and the hinge portion.

5. The clamp of claim 4, wherein a closing insert is inserted in said closing insert opening, and said closing insert causes said clamp to close.

6. The clamp of claim 4, further comprising a fastener, wherein said fastener is inserted in said fastening hole and said fastener tightens said clamp.

7. The clamp of claim 4, wherein the hinge portions are above said clamp portions and said fastener hole is below said clamp portions.

8. The clamp of claim 4, wherein the hinge portions are above said clamp portions; said fastener hole is below said clamp portion.

9. The clamp of claim 5, wherein the closing insert comprises a thumbscrew.

10. The clamp of claim 5, wherein the closing insert comprises an eyehook.

11. A method of attaching a clamp to a cable comprising:
providing two clamp halves,
wherein each clamp halve having a clamp portion, a hinge portion, a substantially circular fastener hole disposed on a bottom portion, and a suspension hole disposed on a top portion, the suspension hole and the fastener hole being disposed on opposite sides of the hinge portion, and
wherein a same axis extends through a center of the suspension holes of the each clamp halve;
connecting the hinge portions of the two clamp halves with a hinge device by inserting the hinge device through openings of the hinged portions of the clamp halves in a hinge axis direction substantially parallel with the cable, opening said clamp by squeezing the top portions together;
placing said clamp over a cable;
closing said clamp by squeezing the bottom portions of the two halves together; and
tightening said clamp by inserting a fastener into the fastener hole of each of the two clamp halves,
wherein the each clamp halve comprises at least two substantially circular fastener holes.

12. The method of claim 11, wherein said clamp is opened by moving said top portions of clamp halves close together; and
said clamp is closed by moving said bottom portions of said clamp halves together.

13. A method of attaching a clamp to a cable comprising:
providing two clamp halves,
wherein each clamp halve having a clamp portion, a hinge portion, a substantially circular fastener hole disposed on a bottom portion, and a suspension hole disposed on a top portion, the suspension hole and the fastener hole being disposed on opposite sides of the hinge portion, and
wherein a same axis extends through a center of the suspension holes of the each clamp halve;
connecting the hinge portions of the two clamp halves with a hinge device by inserting the hinge device through openings of the hinged portions of the clamp halves in a hinge axis direction substantially parallel with the cable, opening said clamp by squeezing the top portions together;
placing said clamp over a cable;
closing said clamp by squeezing the bottom portions of the two halves together;
tightening said clamp by inserting a fastener into the fastener hole of each of the two clamp halves; and
closing the clamp using a closing insert,
wherein only one of the two clamp halves comprises a closing insert opening.

14. The method of claim 13, wherein an attaching device is used to insert said closing insert and close said clamp.

15. The method of claim 14, wherein said attaching device is used to remove said closing insert.

* * * * *